US009232037B2

(12) United States Patent
Toupin

(10) Patent No.: US 9,232,037 B2
(45) Date of Patent: *Jan. 5, 2016

(54) SINGLE ACTION SENSORY PROMPT INTERFACE UTILISING BINARY STATE TIME DOMAIN SELECTION PROTOCOL

(71) Applicant: CURO INTERACTIVE INCORPORATED, Kelowna (CA)

(72) Inventor: Paul M. Toupin, Kelowna (CA)

(73) Assignee: CURO INTERACTIVE INCORPORATED (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,831

(22) Filed: Dec. 17, 2013

(65) Prior Publication Data

US 2014/0106820 A1    Apr. 17, 2014

Related U.S. Application Data

(63) Continuation-in-part of application No. 13/442,533, filed on Apr. 9, 2012, now Pat. No. 8,611,955.

(51) Int. Cl.
| | | |
|---|---|---|
| *H04M 3/00* | (2006.01) | |
| *H04M 1/2745* | (2006.01) | |
| *H04M 1/725* | (2006.01) | |
| *H04M 1/677* | (2006.01) | |

(52) U.S. Cl.
CPC .... *H04M 1/274575* (2013.01); *H04M 1/72588* (2013.01); *H04M 1/72594* (2013.01); *A63H 2200/00* (2013.01); *H04M 1/6775* (2013.01); *H04M 1/72519* (2013.01); *H04M 2250/12* (2013.01); *H04M 2250/56* (2013.01)

(58) Field of Classification Search
CPC ............... H04M 1/72563; H04M 2250/12; A61N 1/36132
See application file for complete search history.

(56) References Cited

U.S. PATENT DOCUMENTS

| | | |
|---|---|---|
| 4,696,653 A | 9/1987 | McKeefery |
| 4,707,855 A | 11/1987 | Pasinski et al. |
| 4,709,387 A | 11/1987 | Masuda |
| 4,827,520 A | 5/1989 | Zeinstra |
| 1,866,765 A | 9/1989 | Yang |
| 4,864,607 A | 9/1989 | Mitamura et al. |
| 5,011,449 A | 4/1991 | Handy et al. |
| 5,345,226 A | 9/1994 | Rice et al. |
| 5,474,484 A | 12/1995 | Lemelle |
| 5,553,121 A | 9/1996 | Martin et al. |
| 5,562,453 A | 10/1996 | Wen |
| 5,746,602 A | 5/1998 | Kikinis |

(Continued)

FOREIGN PATENT DOCUMENTS

| | | |
|---|---|---|
| CA | 2149012 | 7/1993 |
| DE | 4008598 | 9/1991 |

(Continued)

*Primary Examiner* — Wesley Kim
*Assistant Examiner* — Richard Chan
(74) *Attorney, Agent, or Firm* — Antony C Edwards

(57) ABSTRACT

A sensory prompted protocol for the manipulation of complex devices such as consumer electronic devices without the necessity of the visual feedback via textual or graphic data on a graphical user interface, wherein the binary state sensor functions change with time rather than placement, so that a user action biases a binary state input, which is correlated to a timed data stream, the correlation indicating the desired action selected by the user.

14 Claims, 14 Drawing Sheets

(56) References Cited

U.S. PATENT DOCUMENTS

| | | |
|---|---|---|
| 5,884,257 A | 3/1999 | Maekawa et al. |
| 5,897,042 A | 4/1999 | Sims |
| 6,010,339 A | 1/2000 | McDonald |
| 6,012,030 A | 1/2000 | French-St George et al. |
| 6,018,711 A | 1/2000 | French-St. George et al. |
| 6,055,424 A | 4/2000 | Tornqvist et al. |
| 6,064,421 A | 5/2000 | Pohl |
| 6,104,292 A | 8/2000 | Rombom et al. |
| 6,193,579 B1 | 2/2001 | Mak |
| 6,196,893 B1 | 3/2001 | Casola et al. |
| 6,459,910 B1 | 10/2002 | Houston |
| 6,771,982 B1 | 8/2004 | Toupin |
| 6,804,539 B2 | 10/2004 | Toupin |
| 2003/0063010 A1* | 4/2003 | Smith et al. ............... 340/686.1 |
| 2004/0059479 A1* | 3/2004 | Fleming et al. ............... 701/29 |

FOREIGN PATENT DOCUMENTS

| | | |
|---|---|---|
| FR | 2775407 | 8/1999 |
| JP | 007538 | 1/1995 |
| JP | 077538 | 1/1995 |
| JP | 11194798 | 7/1999 |
| JP | 11205430 | 7/1999 |
| WO | 8707460 | 3/1987 |
| WO | 8707460 | 12/1987 |
| WO | 97/12361 | 4/1997 |
| WO | 97/41936 | 11/1997 |

* cited by examiner

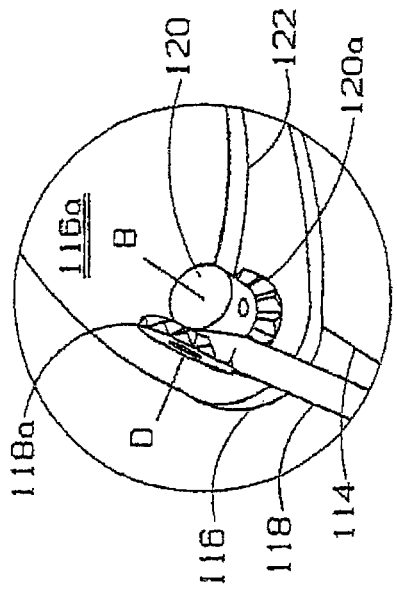
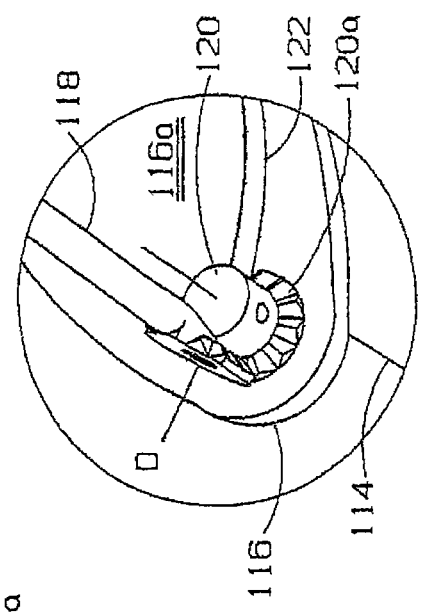
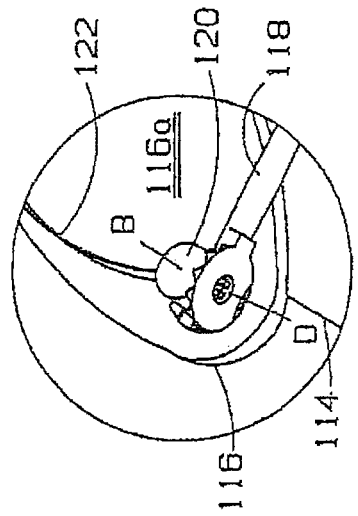
FIG. 14a
FIG. 14b
FIG. 14c

SINGLE ACTION SENSORY PROMPT INTERFACE UTILISING BINARY STATE TIME DOMAIN SELECTION PROTOCOL

CROSS REFERENCE TO RELATED APPLICATION

This application is a Continuation-in-Part of U.S. application Ser. No. 13/442,533 which is a Divisional of U.S. application Ser. No. 12/656,962, filed Feb. 22, 2010 which is a Continuation of U.S. patent application Ser. No. 11/038,083 which is a Divisional of U.S. application Ser. No. 10/957,702 filed Oct. 5, 2004 which is a Divisional of U.S. application Ser. No. 10/246,715 filed Sep. 19, 2002 which is a Continuation-in-Part from U.S. application Ser. No. 09/686,854 filed Oct. 12, 2000, which claims priority from U.S. Provisional Patent Application No. 60/160,637 filed Oct. 20, 1999.

FIELD OF THE INVENTION

This invention relates to a user interface for an electronic device and in particular to a single action sensory prompt interface utilizing binary state time domain selection protocol.

BACKGROUND

The present invention addresses problems presented by conventional user interfaces, for example in consumer electronic products such as telephones, appliances such as televisions, washing and drying machines, ovens, etc. It relates to a process and the configuration of apparatus that can accurately and automatically interpret the user's desired selection after a single action following a sensory prompt. One aspect of the interface of the present invention resides in its ease of use for people who are less technically able. The interface may be embedded inside almost any product.

Applicant is aware of prior art within the field of user interfaces for consumer electronic products, for example interfaces employing voice recognition, graphic touch panels, and intelligent keypads. Such prior art user interfaces for consumer electronic products consist of a broad range of technology mixes. The current trend is to use a more organic style of interface such as voice recognition or graphical interfaces rather than arrays of mechanical buttons. Some devices attempt to guess a user's most probable decisions, making navigating complex decision trees more tolerable. The present invention is derived out of necessity for an easy-to-use interface that, for example, may be embedded in electronic equipment so for example to operate without a keypad or display.

One object of this invention is to provide an alternative method of operating equipment for example such as cellular or wireless telephones or other devices such as equipment which may be operated using binary input devices including but not limited to push buttons, switches, digital signals, microphones, motion sensors, light detectors, rotary encoders, voice recognition processors, or processes, wherein sensory prompts such as audio prompts guide the user through options, and the user responds with a timely binary action to accept or reject the specific option presented during a corresponding time window.

SUMMARY

In embodiments described herein the user of a device such as telecommunication, appliance, or other electronic device is presented with an action, an option or a series of options via a series of sensory prompts via a sensory broadcaster. The user indicates acceptance or rejection of an option with a timely action, referred to herein as a binary input, for example such as pressing a button disguised within a product such as a plush doll. The timely action must occur during the time window in which the prompt implicitly or explicitly indicates the intention to accept or reject an option. Otherwise, the interface may indicate the default selection to the device. For example, a default selection may be to cycle a number of times through a menu, for example three times, and failing getting a response backup one level in a decision tree and again cycle through the menu at that level a number of times, and failing getting a response backup yet a further level, and so on until the interface or device is left idling, for example in a safety mode or in a standby mode. The interface is thus well adapted for use by for example a child, or for example by a visually impaired person, or even merely for use by people who are driving automobiles, ie, as a hands-free and should not be taking their eyes from the road ahead, because the interface does not require an action by the user as no action is treated as a selection choice thus differentiating from prior art for example which presents a three position tree to a handicapped person thus requiring an action from the person.

The invention is thus, in one aspect, a process of navigating menus or selecting actions or options. The process may utilize a sensor system configured to behave as a binary state switch or binary input sensor along with a prompting broadcast (or other serial presentation) and feedback system. These two elements are synchronized to permit correlation analysis of signals, which yields information or signals that indicate the user's selected option or desired action.

The novelty lies, at least in part, in the ability of a device, such as a binary push button, to select one of multiple options by indicating the option as desired or undesired as they are presented through time via speech. Acceptance or rejection is indicated by the presence of one or the other of the two possible binary states during the corresponding time window.

The selection time window can be within the time domain of spoken words or sounds of the prompt, which may include quiet time and may also include, or consist only of, other audible queues or music or other detectable vibrating prompting.

This interface protocol permits functional manipulation of complex devices, such as personal telecommunication devices, consumer and commercial electronic devices and appliances, motion sensor, light detector, rotary encoder, voice recognition processor, without the necessity of the visual feedback via textual or graphic data. Since the sensor functions change with time rather than placement, both visual and tactile demands placed upon the user are dramatically reduced, offering an advantage over the complex array of graphic symbols and the symbolic placement of buttons found on multifunction keypads. In the present invention an action is converted to an electrical impulse, which is correlated to a precisely timed data stream. The correlated data indicates the desired action or option selected by the user. This allows a device such as those listed above to be embedded in a product without altering the external aesthetics of the product. In some cases, the ability to be hidden within the product will be an essential component of the invention's application.

In a further aspect, the present invention is a communication protocol that defines the parameters of actions, data transfer, acknowledgment and response for the purpose of a user interface, for example in a consumer electronic device. The user/operator listens to a stream of prompts such as audio messages that indicate available options. The user selects an action, an option or an optional path through a menu tree by either doing nothing, or by biasing, for example such as toggling or otherwise reversing the state of a binary state device, so as to select the alternative choice, action or path available at that moment. When the user makes no selection, it indicates acceptance of a default choice, direction or action such as backing up a level in a decision or menu tree.

In one embodiment, the audio stream may present an ongoing list during which the user intervenes to select the desired option. The default action in this embodiment may then be to merely present the next item in the list.

The present invention may be described as a time domain multiple selection protocol in which for example, and without intending to be limiting, a binary state indicates a selection by inversion of the binary state during the defined time window for the desired selection utilizing mechanical, electromechanical and electronic circuitry. The present invention requires the presence of three key elements, a binary input binary means, a prompt or output means and a method for keeping track of the state of the binary input means series of prompts as the prompts are being broadcast or otherwise presented. (herein referred to as a sensory broadcast) The user interface is a timing based multiple selection protocol consisting of mechanical, electromechanical and electronic circuitry for a novel method of making and selection from a menu or list of items.

Thus, in summary, the present invention consists of a time domain, multiple selection protocol in which a selection of an option is made during the defined time window for the desired action or option. The action or option is presented for example in an audible audio information stream that is precisely timed or synchronized with the monitoring of binary input sensors to allow electronic signals to indicate and be processed in such a manner as to yield information regarding the user's choice.

In one embodiment an audio stream presents a series of actions or options from which the user may select an option via any binary input device, such as a push button switch. The device may also operate with for example a limited binary state voice recognition interface, motion sensors, light sensors, etc. A preset default option is assumed unless indicated by the user causing an input during the time domain of presentation of information pertaining to the desired option. Presented information is any information that could be used to indicate the nature of an option and its selection time frame.

The configuration of electronic components, circuitry, mechanical or electromechanical sensors and/or computer software/firmware for providing information to the user and the host system regarding the user-desired action or option uses such physical resources and time stamping to determine the user's activity and report information via an electronic or mechanical signal that a processor can process as a specific action or intent.

A device incorporating the present invention may operate while embedded in another product, for example a consumer electronics product, without altering the external aesthetics of the product, and without visually disclosing the embedded functionality.

Put another way, the present invention may be summarized as a sensory prompted interface device using a time domain multiple selection protocol wherein the device may include:
 (a) a device housing,
 (b) a processor and cooperating memory and a power supply mounted in the housing,
 (c) a sensory broadcaster mounted in the housing and cooperating with the processor for broadcasting outside of the housing a sequenced series of sensory prompts supplied by the processor to the audio broadcaster,
 (d) a binary state sensor mounted in the housing for receiving input from a user, in one embodiment the input for binary biasing of an input switch between opposite binary states in response to a single prompt of the series of audible prompts,
 (e) a timer cooperating with the processor, the processor correlating the response to the single prompt with a corresponding single time domain within a sequential series of time domains timed by the timer, and
 (f) the processor correlating the single time domain with the single prompt and executing a single action corresponding to the single prompt according to an instruction set in the memory, wherein, if for example the single action is a telecommunication action, the processor executing the single action in further cooperation with a telecommunication transceiver mounted in the housing.

The device housing may be a flexible surface and the input receiver may be mounted beneath the flexible surface. The device housing may have an audio transmitting surface and the broadcaster may be mounted beneath the audio transmitting surface.

In one aspect of the present invention, the product or device may be a plush toy, which may have at least one appendage. Such an appendage may be pivotally mounted to a body of the plush toy. The appendage may cooperate with a processor so that a first position of the appendage relative to the body switches the processor into a stand-by mode, and a second position of the appendage relative to the body switches the processor into an active mode so as to trigger the series of prompts. The appendage may include an opposed pair of elongate appendages such as arms, legs or the like. The pair of appendages may pivot relative to the body between a resiliently clamped, closed position wherein the appendages are adjacent, and a spread position wherein the pair of appendages are spaced apart. The first position may be the closed position and the second position may be the spread position.

In one embodiment, the first and second positions lie substantially in a first plane. In a third position the pair of appendages are elevated out of the first plane. In the second position the audio broadcaster audibly transmits at a first audible volume and in the third position the audio broadcaster audibly transmits at a second audible volume, wherein the first audible volume may be greater than the second audible volume. In the third position the ends of the arms, which may be shaped as hands, cup a mouth of the plush toy. In this embodiment the audio broadcaster may be mounted behind the mouth of the plush toy. When the ends of the arms are hands in the first position the hands are together in front of the plush toy, and in the second position the hands are widely spread apart.

In a further aspect of the present invention the input switch may be a push-button switch, and the series of audible prompts may be prompts in a multi-level menu tree. The input switch may also be a microphone in conjunction with software to detect any audible response versus no audible response, the audible response biasing, for example a binary switch to its opposite binary state. The series of audible prompts may comprise a sequentially audibly broadcast list of names from a list of names in the memory, wherein the single prompt is a single name from the list and the single action corresponding to the single name is to dial a telephone number, from a corresponding list of telephone numbers, corresponding to the single name. Advantageously the list of names may be statistically ordered based on frequency and time of calling by the user so as to present first numbers most likely to be called. In one preferred embodiment, the input button switch may be biased a plurality of times in rapid succession and the action corresponding to the single action is different depending on the number of times the input switch is biased in rapid succession. In another preferred embodiment the speed of audible presentation of the prompts may be increased by compressing the audio data in the prompts, and in such a case the prompts may be sped-up in an adaptive feedback loop so as to increase the presentation speed until user mistakes meet a threshold cut-off level.

The method of the present invention may comprise the steps of:
(a) broadcasting outside of the housing from the sensory broadcaster a sequenced series of sensory prompts supplied by the processor to the sensory broadcaster,
(b) receiving input to the input receiver from a user, the input for example toggling a binary state input receiver in response to a single prompt of the series of prompts,
(c) timing, by the timer, a sequential series of time domains,
(d) correlating, by the processor, the response to the single prompt with a corresponding single time domain within the sequential series of time domains,
(e) correlating, by the processor, the single time domain with the single prompt, and
(f) executing a single action corresponding to the single prompt according to an instruction set in the memory.

BRIEF DESCRIPTION OF THE DRAWINGS

Aspects of the present invention are illustrated, merely by way of example, in the accompanying drawings in which:

FIG. 14a is an enlarged cut-away view taken from FIG. 9.
FIG. 14b is an enlarged cut-away view taken from FIG. 10.
FIG. 14c is an enlarged cut-away view taken from FIG. 11.

DETAILED DESCRIPTION OF EMBODIMENTS OF THE INVENTION

Figure 1:
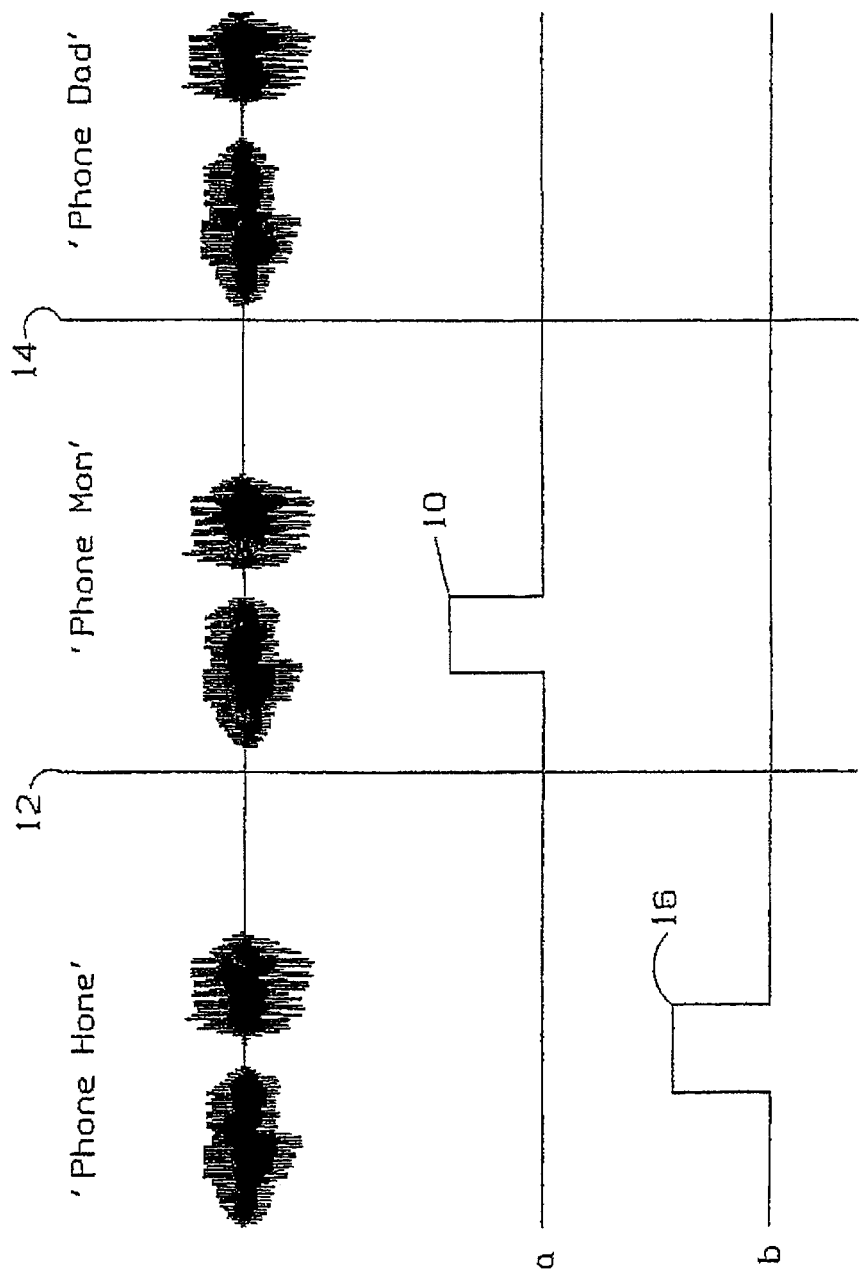
FIG. 1 is a signal timing diagram.
Figure 2:
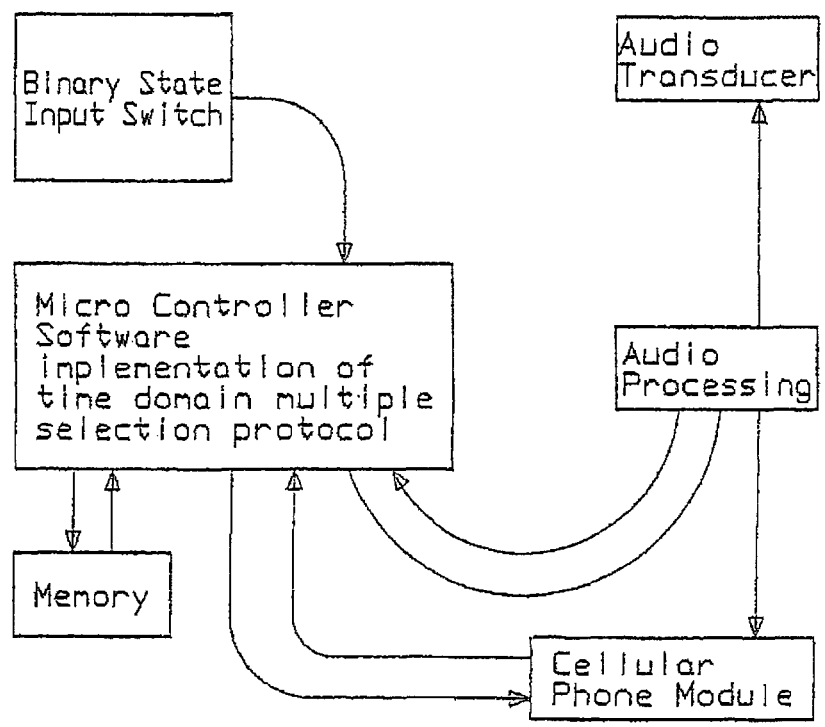
FIG. 2 is a schematic illustration of the components of one embodiment of the present invention.
Figure 3:
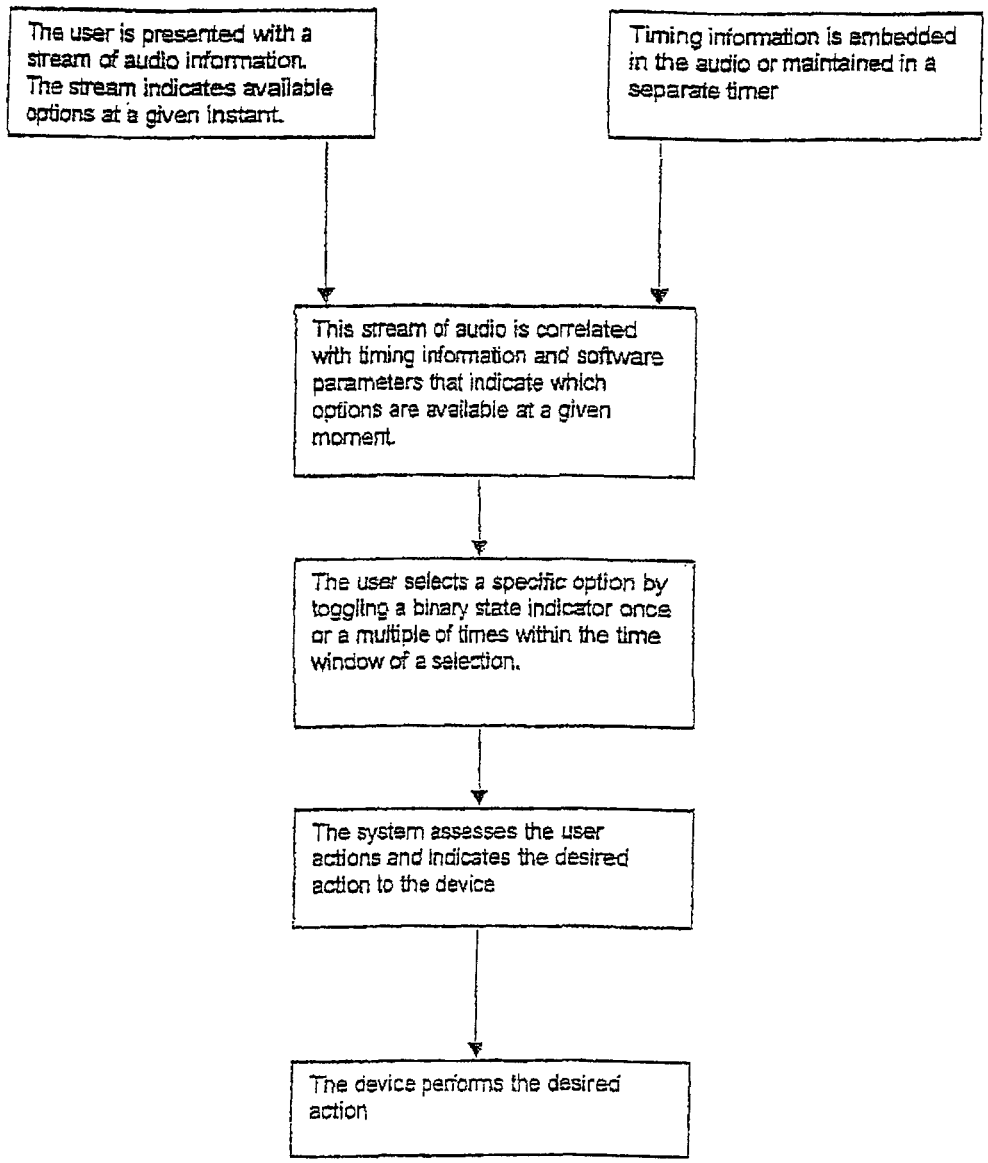
FIG. 3 is a sequence of events diagram.

What follows is an example of one embodiment according to the present invention which is not intended to be limiting. Thus, with reference to the timing diagram of FIG. 1, the upper line describes an audio signal, that is, a plot of signal intensity over time. As a message is spoken or otherwise audibly broadcast to a user by an electronic device such as a telecommunication device, employing the interface of the present invention, the audible signal level increases as diagrammatically illustrated in the "audible signal" line and time transpires. The middle and lower lines indicates two of the three possible selections, so that in the case where the user desires to "phone mom", the user's timely input (for example by squeezing so as to toggle a push-button switch) would cause a waveform having a pulse within the "phone mom" selection time window. Thus, waveform "a" would result in a selection to phone mom. The pulse 10 indicating a state change could have occurred any time between time lines 12 and 14. The pulse 16 in waveform "b" is well outside the phone mom selection window and would make a different selection, in this case to "phone home". This is a simple example of the user interface of the present invention. here a sensory prompt (here an audible prompt by way of example) results in a binary input (here squeezing by way of example) by the user to make the selection.

Users of this interface are not required to look at the telecommunication device during operation, eliminating the need for displays and the interpretation of visual symbols on buttons or graphics on the displays, and also eliminating components such as the keypads popular in the wireless telephone industry today. Also, the user's finger, or other selector, can maintain close proximity while making a selection, which makes the device easier, and in some conditions safer, to use. The input from the user may be a physical toggling of a binary switch, or it may be non-contact biasing of a binary state switch by, for example, the use of motion or light detectors, or by audible sound sensors, voice recognition etc.

Other binary transition-detecting devices would also work such as three-axis accelerometers to detect as a binary input a physical orientation change for example the flipping-over of the sensor (or the device itself), three-axis gyroscopes to detect a change in orientation, or for example a three-axis magnetomoter to detect as a binary input an orientation change relative to a magnetic pole. Pressure, touch, tactile/haptic based sensory devices, and pressure, touch, tactile/haptic based promptly devices may also be employed, where the prompting device prompts the user for binary response within a time domain, and the user makes the selection if the user responds with a binary input within the time domain corresponding to that selection.

In the example where the sensory prompt included an audio signal, the audio may for example be pre-recorded and embedded in the device, or may be streamed into the device by way of a telecommunication signal or so-called "wifi" signal in a localized radio-frequency hot-spot cooperating with a transceiver in the device to transmit and receive radio frequency signals for example over the internet (or other frequency signals as the transceiver and hot-spot technology may provide for). Other examples of binary state input may merely be the location of the device, for example relative to the user or relative to other things. Thus for example if the device is in a users pocket, purse, backpack, glove box, etc (as detected for example by an inductive coupling or other proximity detection or coupling of the device when in the pocket, purse, etc) then the device may be in a first state, eg. dormant/ battery conserving if placed in that location within a time domain following a sensory prompt.

The sensory prompt such as a streamed audio prompt tailored or specific to the selection available at that time, or in that situation, to a user would be delivered to the user by a sensory broadcaster defined herein as being any detectable event emanating from the device, detectable by the user's human senses, or as a result of a command or signal from the device to a remote broadcaster, for a example to a remote speaker, or to a remote rumble generator or buzzer or other vibratory device.

An example of a streamed audio prompt may for example by a "pre-announce" of a caller's identity or an audio-clip of a caller's introductory words being spoken by the caller that the user will hear, and unless the user then indicates to accept the call by a binary input to the device, for example by speaking a "yes" or "accept" to the device within the corresponding time-domain (eg, five seconds following the audio clip), the call is declined and the caller is transferred to voice-mail/messaging. An example may this be that a user's mother is calling, and when prompted at her end, the mother states "it's mom, this is urgent, please answer is you can . . . ". The user of the device (eg the daughter) then knows without looking at the device (if it has a visual GUI) to give the binary input to accept the call if possible because it is a priority call. The binary input may be simply rotating the device to flip it over or back-and-forth a couple of times using a wrist rotation motion, or may be merely to pull the device from its present location in a pocket, or to speak to the device, or to press or squeeze the device in one or more locations in sequence or simultaneously, some or all of which may be interpreted by the device's processor as a binary (yes) input and the call is accepted so the daughter may speak to her mother.

Other time domain based selections may be available to the daughter rather than merely accepting or declining the call. The first time domain may be, as already described answering the call from mom in the fashion of holding the device to the ear. The second time domain may for example cause the call to go to a speaker-mode for hands free acceptance of the call and talking in this case to mom. This would be useful if the daughter has her hands full or was driving thus was prevented from pulling the device from her pocket. The binary input for this second time domain may then be for example accepting the call by the daughter saying "yes" loudly within the second time domain—possibly within a time domain of a further five seconds. The third time domain may send mom to voicemail if the daughter gives a form a binary input (eg. squeeze, flip, shake, pull-from-pocket or put-into-pocket, or speak) which is recognized by the processor in the device.

If none of these inputs are received by the device within the time domains (eg. five seconds for each) then the daughter may have other options that may be selected in subsequent time domains in the sequential series of time domains, for example reject the call entirely and hang-up, send a pre-recorded message that the user is unavailable but will call back, and then prompt the user after a preselected time to return the call. For example one time domain may be to prompt the user to call back after 30 minutes, another time domain if selected by the user will prompt the user for a call back after an hour (or two) and so on.

The binary input is not limited to a digital signal, as an analog signal may be processed by the device processor and interpreted as a binary input. In this sense then an input switch is given a broad meaning within this specification as indicating any input capable of being interpreted by the device processor as a binary input, rather than a more conventional meaning of switch which is limited to mechanically opening and closing a circuit.

As used herein, rather than an electronic device which is reliant solely on a graphical user interface or GUI, a device according to the present specification uses a "sensory prompted interface" (SPI) which use human senses other than merely sight (ie, conventional visual GUIs) working in conjunction with time domain protocols, examples of which are described herein, so that one or more of a user senses (such as touch or hearing) is prompted and the SPI looks for a binary input from the user within a corresponding time domain, which if made by the user, is interpreted by the device processor as the corresponding selection, for example the corresponding action to be taken or not taken by the processor as the case may be.

Binary inputs may, in addition to those described above and below, include one or more physical and detectable actions by the user, such as blow/intake a breath, speak/clap/whistle/snap fingers, gesture/wink/blink/double blink as would be recognized by a gesture or facial motion analyzer, press/swipe/press-and-expand/twist. The binary inputs are made or done by the user during a series of sensory prompts by the SPI, timed by the user to give the binary input corresponding to a desired selection associated with one of the prompts in the series, so that the binary input is associated by the device processor with the corresponding time domain corresponding with the user's desired selection.

Other examples of sensory prompts given by the device to the user, either directly or indirectly (for example the prompt is given by a remote slave device), include modulated haptics wherein for example the device modulates its vibration (eg. changes vibration intensity) to send a variety of prompts to the user. A harsh vibration may mean one thing, a soothing vibration another, as would be learned and understood by the user.

Importantly, in one embodiment the device processor may apply a statistical analysis on an on-going basis, monitoring and analyzing a user's habits and therefore presumably the users preferences. Where the device is for example a telephone, computer, or internet browser, the device processor may re-order the first few (or all) selections or prompts presented to a user to put respectively the preferred telephone numbers, files, or websites first or more-or-less ahead of other prompts in the series of sensory prompts given by the SPI. This ordering may change over time as a user's preferences change over time as detected, analyzed and stored by the device processor. This may be characterized as adaptive feedback from the device to the user.

The interface of the present invention is a departure from current interface design in its operational style, its elegance and simplicity. However, it does have its drawbacks. It may be slower compared to normal operation of a conventional keypad. It may be best suited to tasks that do not require the user to remember past actions. For example, entering long strings of numbers which can be taxing for the user.

A physical embodiment of the present invention may have three elements, namely:
  (a) means, such as a processor (including associated memory), a microphone and a power supply, of generating and broadcasting a meaningful and audible audio stream which includes a sequential menu-tree series of prompts to direct the user's decision-making;
  (b) a sensor that senses and transmits or applies a signal to the processor indicating a user input timed to denote the user's desired option; and, (c) a timing and correlating processor (which may be the same processor as in (a) above) that correlates in time audio presentation of the audio stream and user input signals.

Further processing features enhance operation of the interface of the present invention, namely:
(a) statistical ordering; that is, the processing of numbers such that the numbers that are most pertinent to the user are determined by statistical analysis based upon both call time and frequency;
(b) audio compression; that is, the process of compressing sounds so as to increase the speed of presentation of audible prompts (for example a sequential counting of numbers) in the time domain while maintaining essential message intelligence for the purpose of presenting more information in a given instant. This is desirable for use in a voice prompt based user interface for example in a personal communications device and may be accomplished by, for example, removing 40 percent of the digitized audio data without causing a sound frequency shift;
(c) adaptive feedback; that is, monitoring activities that are subliminal to the user but detectable to the system to control the nature of the user interface with the intention of making the user interface more effective for the user. The activities of most interest in are those that affect the speed of presenting or processing of information that is fast enough to keep interest and slow enough to be usable in a reliable manner. By using audio compression, as the user leaves, the speed of presentation of the prompts is increased until the processor detects an increase in user mistakes above a preset threshold; and,
(d) pre-ring messaging so that an identifying name of a caller is audibly announced to the user (for example: "it's mom").

What follows is a detailed description of implementation of one embodiment of the interface of the present invention in the operation of a telecommunication device embedded in a plush toy. The plush toy is referred to herein as a "companion telecommunicator" such as it would be perceived by a child if the companion telecommunicator was a favorite plush doll. The programmed menu structure and logic flow that a user follows during operation of the companion telecommunicator are set out below. Appendix A hereto provides further detail, short of the actual code, of the sequence scripts for each step in the menu structure. Detailed actual coding is not provided as one skilled in the art would know how to program and implement the interface of the present invention given the level of detail disclosed.

To the user, such as a child, the companion telecommunicator appears to talk naturally, prompting the user with options. By simply squeezing the companion telecommunicator, the user places a call, makes emergency contact, records reminders and saves phone numbers. Call lists maintained by the companion telecommunicator processor are updated and sorted automatically, chronologically or according to popularity, with most recent or most frequently called numbers at the beginning. The companion telecommunicator tells the user that someone is calling by announcing the caller's name, or with a customized greeting, or with a standard telephone ring, a melody or by vibrating.

Figure 4:
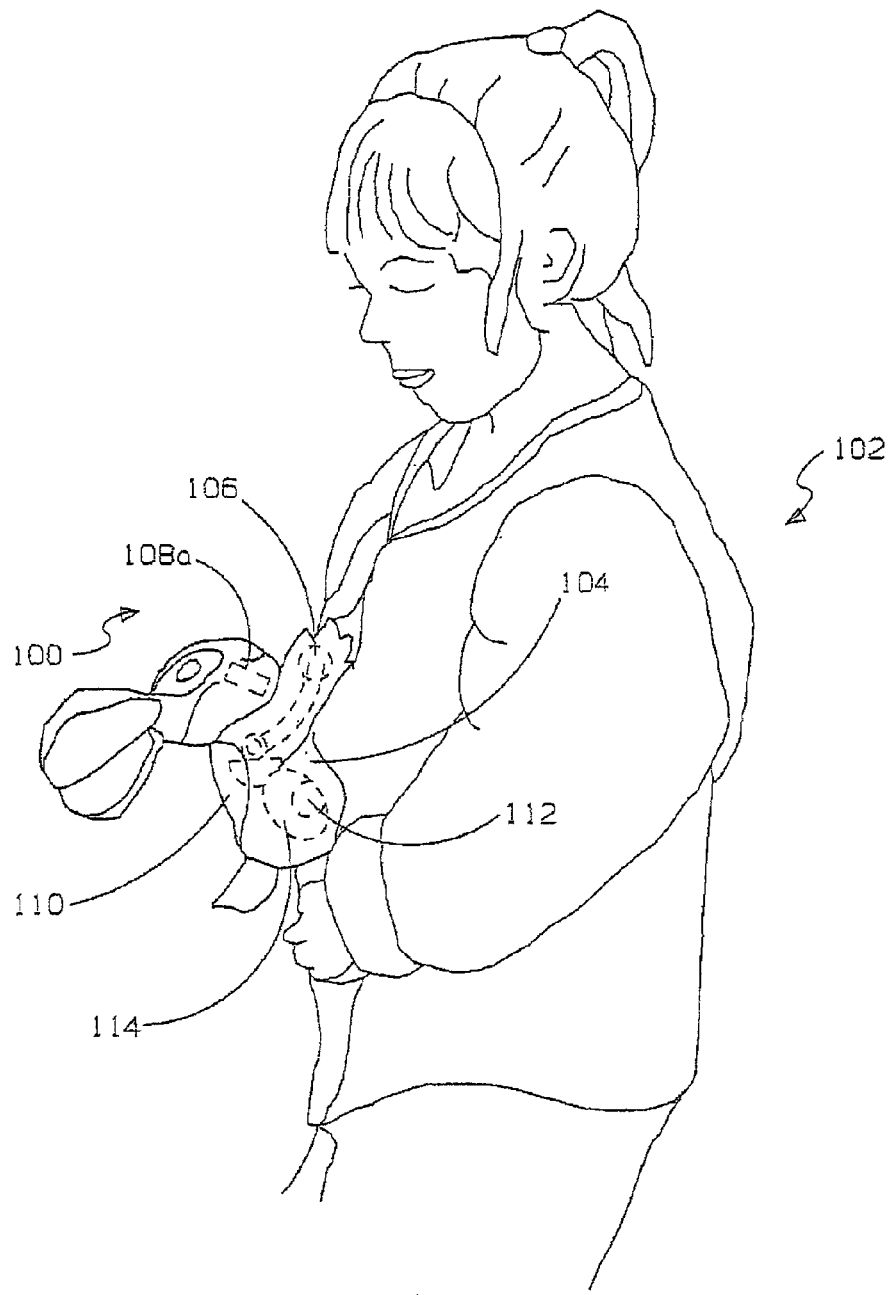
FIG. 4 is, in side elevation view, a companion telecommunicator of the present invention clipped onto a child's clothing.

As seen in FIG. 4, companion telecommunicator 100 attaches to the clothes of a user 102 or for example to a user's backpack (not shown) for transport by the resilient clamping together of the hands 106. The companion telecommunicator may also have loops (not shown) that will attach to key rings or clips for easy transport.

Figure 5:
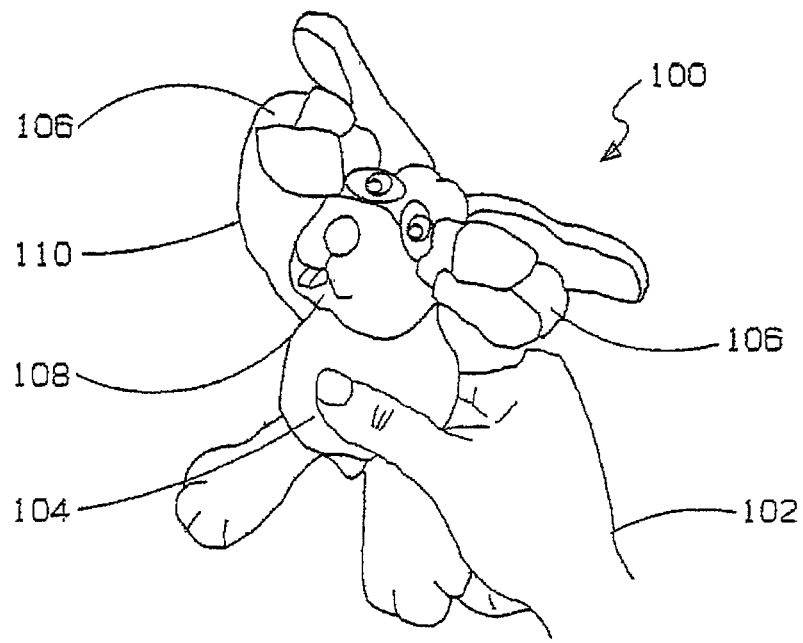
FIG. 5 is, in perspective view, a user squeezing, so as to operate, the companion communicator of the present invention.

After long periods of inactivity, companion telecommunicator 100 will go dormant. Companion telecommunicator 100 is woken up by squeezing its tummy 104 as seen in FIG. 5 gently for three seconds. Companion telecommunicator 100 greets user 102 then audibly broadcasts that it is in stand-by, speaking or whisper mode. Companion telecommunicator 100 may be intentionally made dormant or "put to sleep" by gently squeezing tummy 104 for three seconds. Companion telecommunicator 100 counts down "three", "two", "one" then says "good-bye". Squeezing for three seconds will not however put the companion telecommunicator to sleep during a conversation or while announcing a call.

Figure 6:
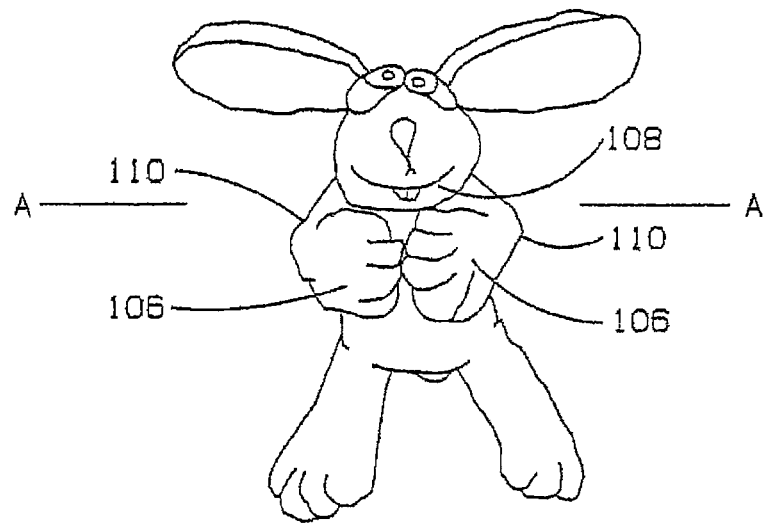
FIG. 6 is, in front elevation view, the companion communicator of FIG. 5 in stand-by mode.

When companion telecommunicator 100 is in stand-by mode, it is ready to receive calls. User 102 can ensure that companion telecommunicator 100 is awake by giving it a gentle shake which is detected by accelerometers 103, shown diagrammatically in FIG. 16, or other sensors, as would be known to one skilled in the art. If it giggles, it's awake. The companion telecommunicator's hands 106 are positioned as if clapping to put it in stand-by mode, as seen in FIG. 6. Thus companion telecommunicator 100 can hold on to user 102 while in stand-by mode as seen in FIG. 4.

Figure 7:
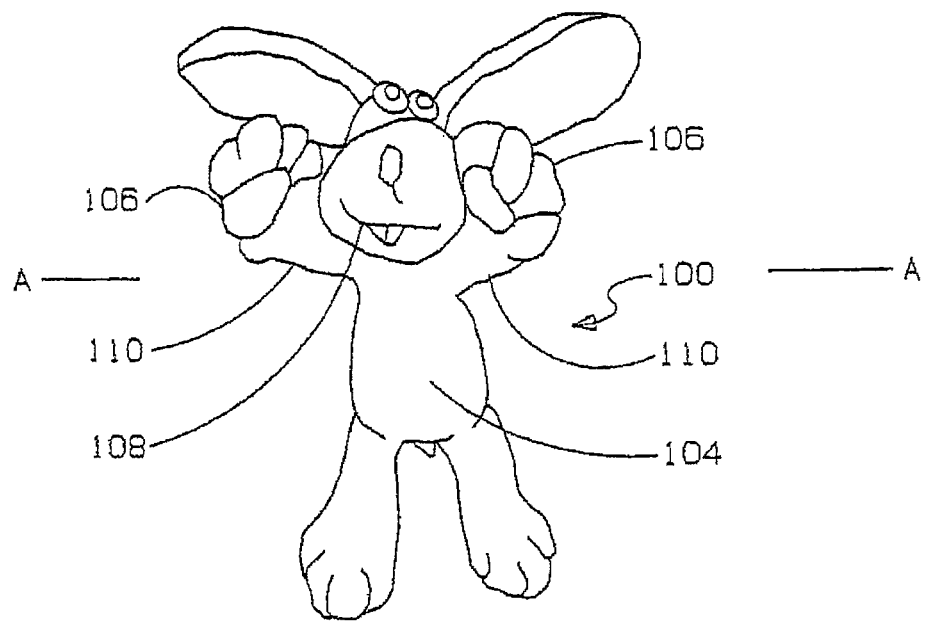
FIG. 7 is, in front elevation view, the companion communicator of FIG. 6 in whisper mode.

Whisper mode is for private conversations. In whisper mode, the audible volume is lowered so that user 102 may hold the microphone 108a embedded in, for example, the mouth 108 of companion telecommunicator 100 near to the user's ear. Companion telecommunicator 100 is put into whisper mode by lifting arms 110 out of plane A so that it looks like companion telecommunicator 100 is whispering as seen in FIGS. 5 and 7. Mouth 108 of companion telecommunicator 100 is brought to the user's ear so that the user can listen for directions.

Figure 8:
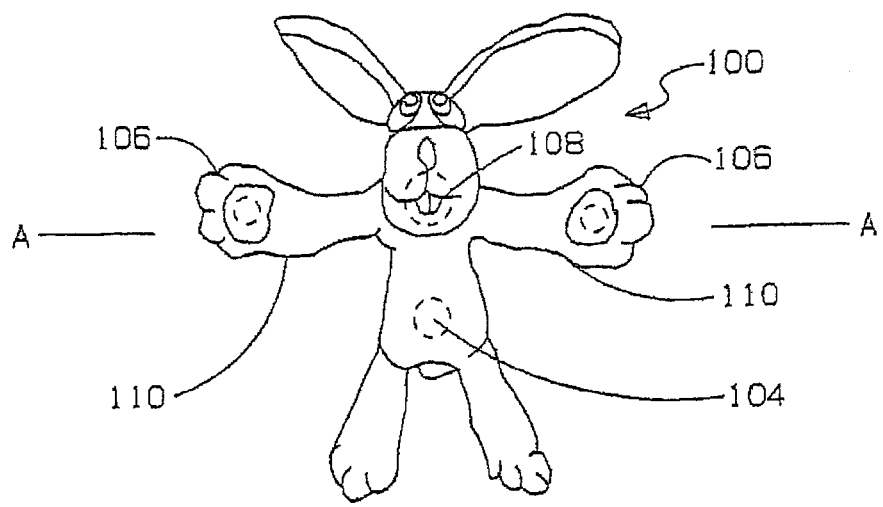
FIG. 8 is, in front elevation view, the companion communicator of FIG. 7 in broadcast mode.
Figure 9:
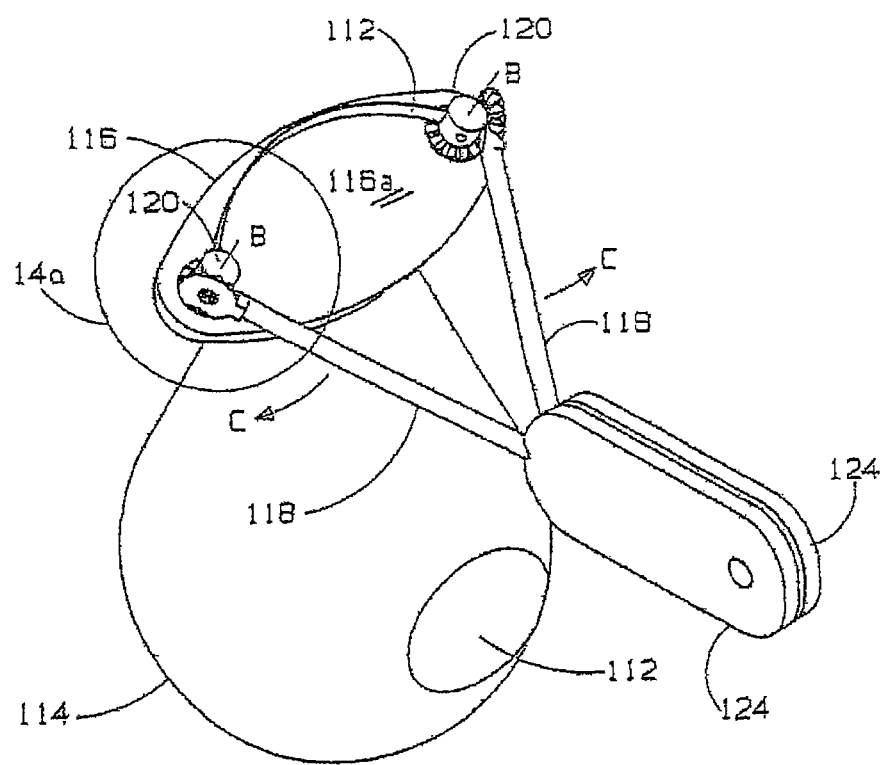
FIG. 9 is, in perspective view, the processor housing and endoskeleton of the companion telecommunicator of FIG. 4.
Figure 10:
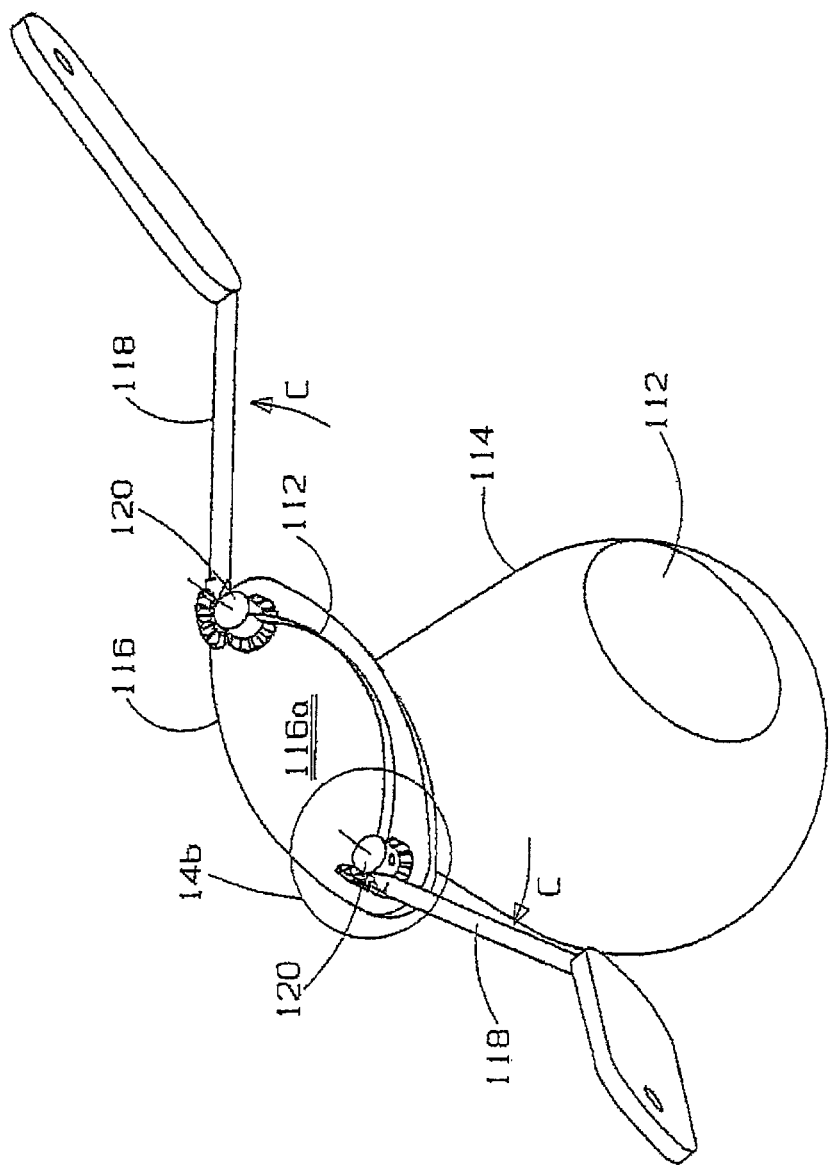
FIG. 10 is the housing and endoskeleton of FIG. 9 with the arm structure in speak mode.
Figure 11:
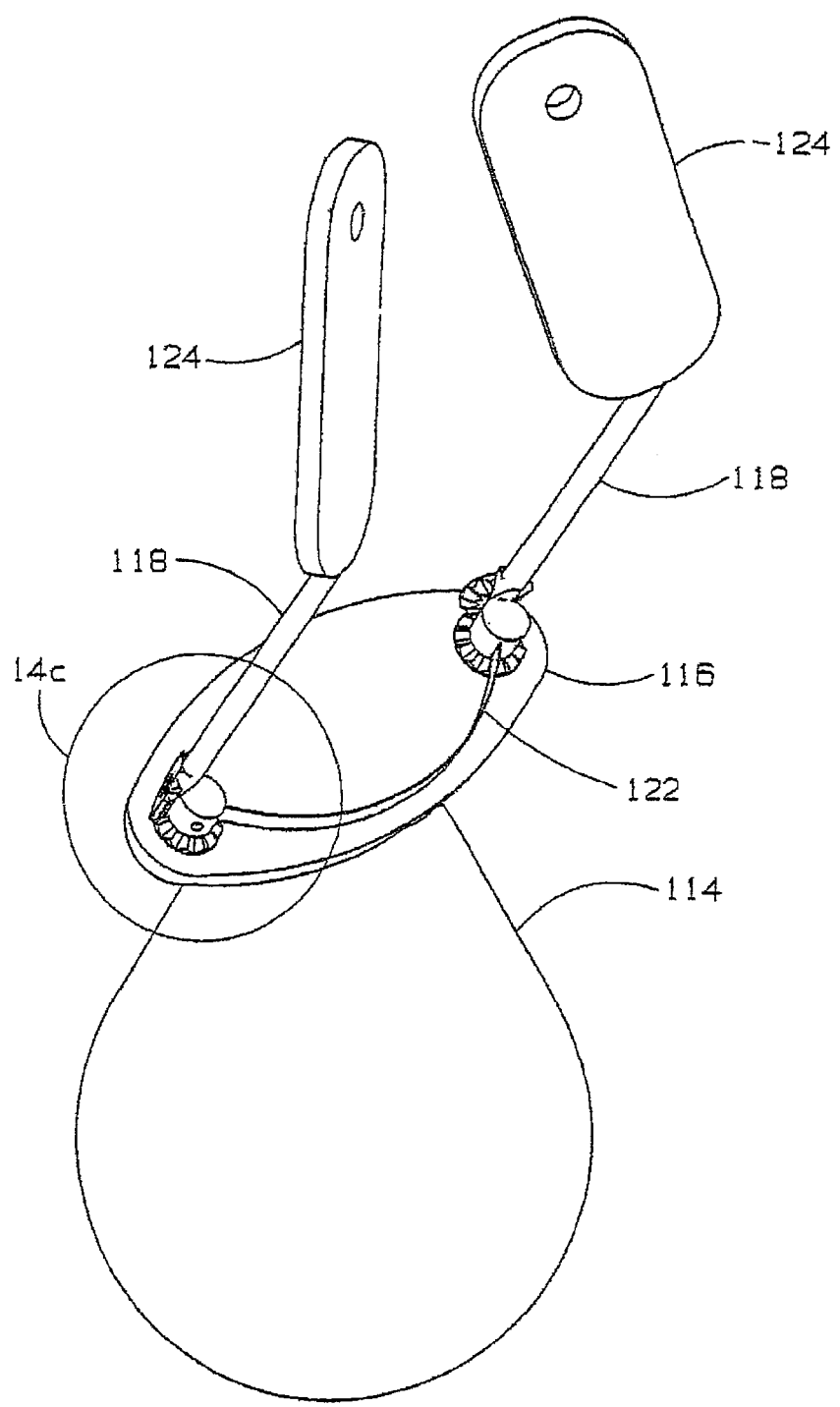
FIG. 11 is the housing and endoskeleton of FIG. 10 with the arm structure elevated into the whisper mode.
Figure 12:
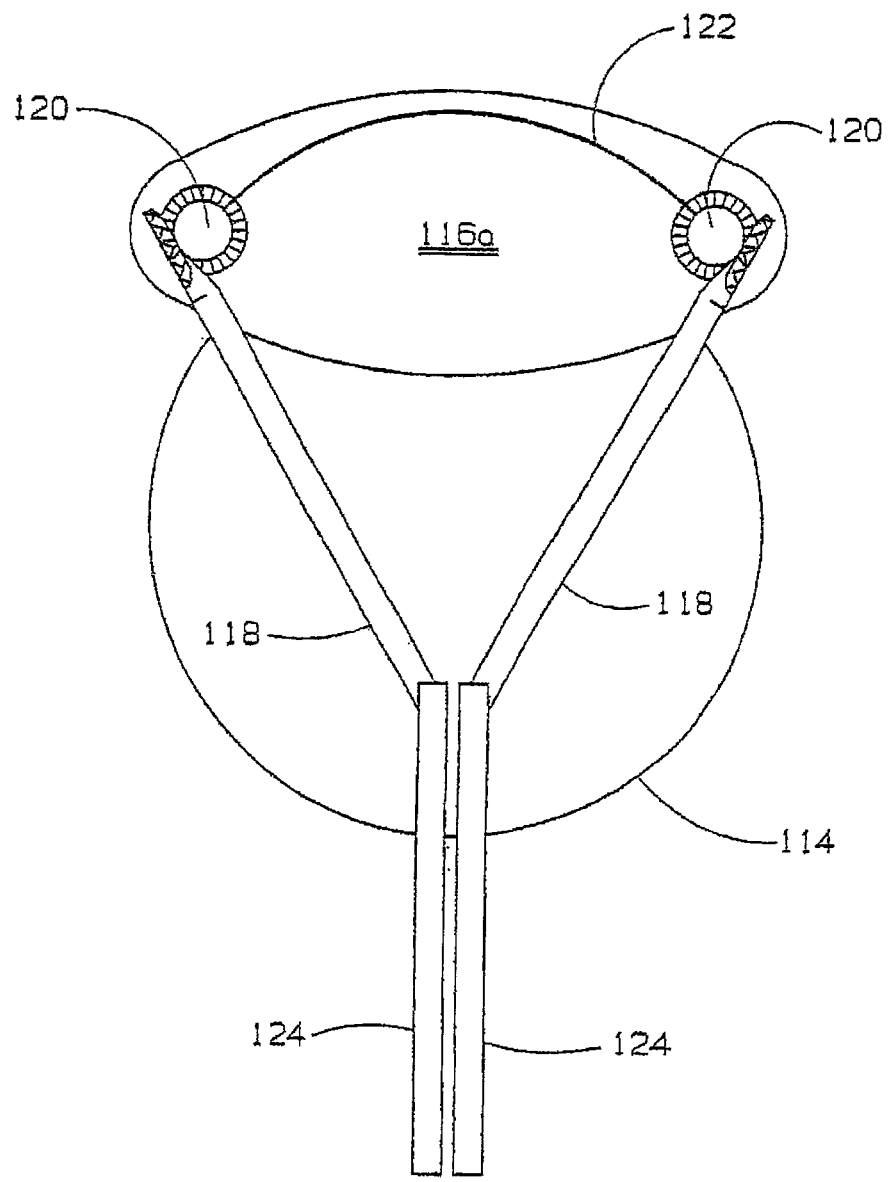
FIG. 12 is, in plan view, the housing and endoskeleton of FIG. 9.
Figure 13:
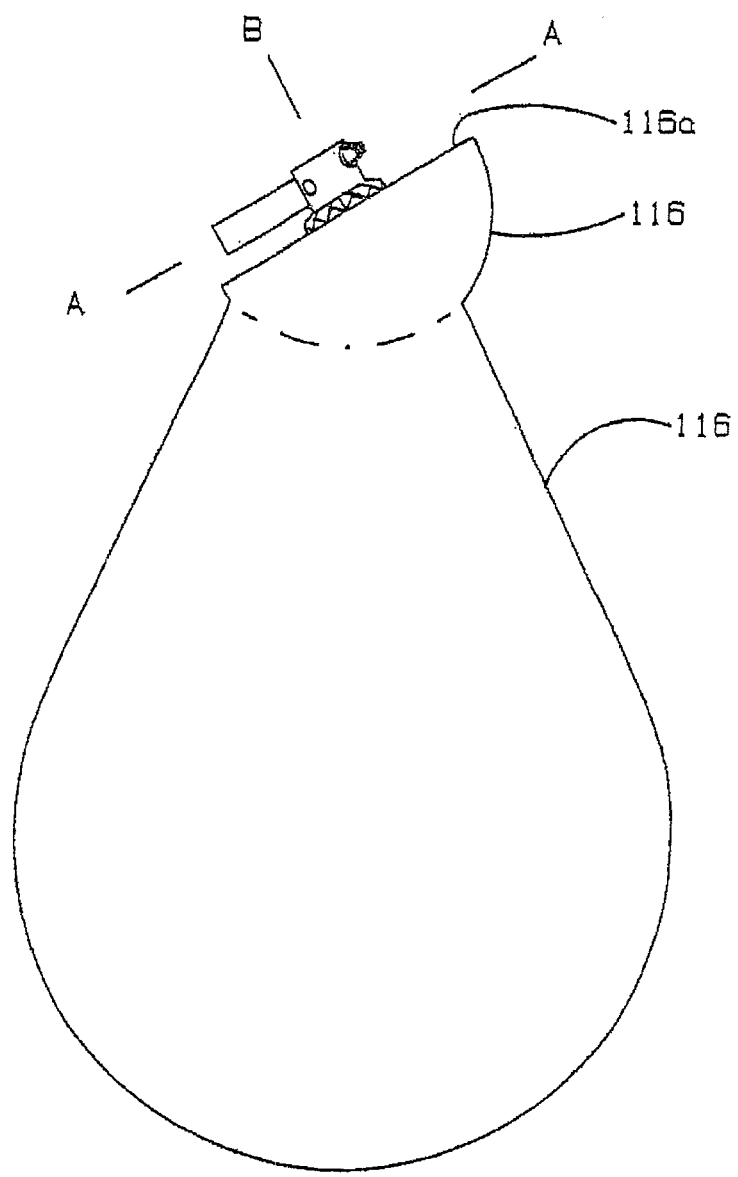
FIG. 13 is, in side elevation partially cut-away view, the housing and endoskeleton of FIG. 12.
Figure 15:
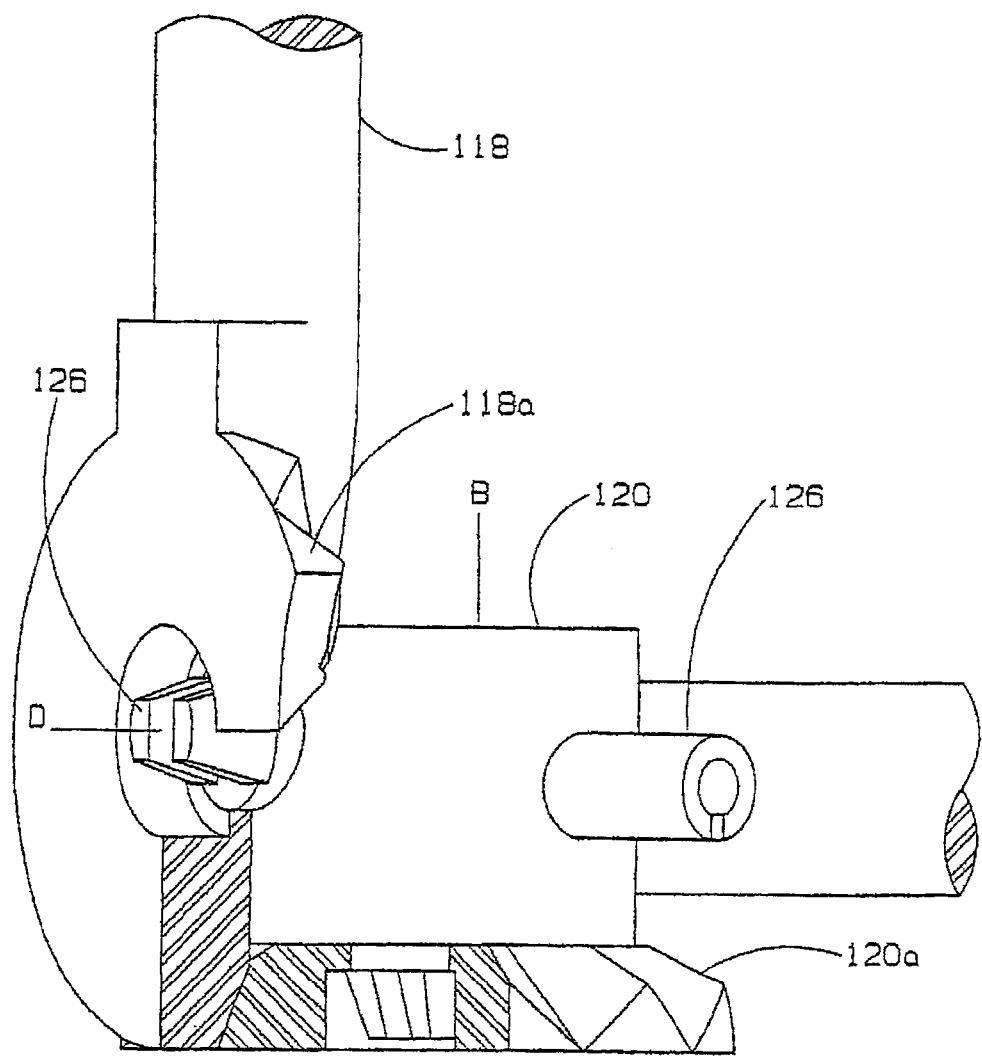
FIG. 15 is an enlarged cut-away view of the pivotal arm strut mounting of FIG. 14c.

Speaking Mode allows the companion telecommunicator to speak loudly so that the audible directions can be heard by a group of people. Companion telecommunicator 100 is placed into speaking mode by opening the arms 110 as seen in FIG. 8. In speaking mode the arms have been rotated in plane A from the clapping position to the spread apart position.

To use companion telecommunicator 100, all user 102 has to do is hold the companion telecommunicator, listen and squeeze tummy 104. this depresses an internal push-button switch 112 mounted in rigid processor housing 114 seen in FIGS. 9-14. When the companion telecommunicator speaks via microphone 108a, the user squeezes tummy 104 so as to depress switch 112 to tell the companion telecommunicator what the user wants. When the companion telecommunicator is in whisper or speaking mode, it talks to the user. To make a selection, the user squeezes the companion telecommunicator while ifs talking, or during the moment before the next selection. The squeezing provides a binary input detected by the device processor as better described below. Other forms of binary input would also work as described above, for example an action which is detected by the accelerometers 103 such as shaking, inverting or flipping, etc.

The companion telecommunicator uses a 3.6 volt lithium ion battery (not shown). If the battery is getting low the companion telecommunicator will periodically say "low battery". This alarm will increase in frequency as the battery power gets lower.

Companion telecommunicator 100 uses a mechanical endoskeleton mounted within the arms and body of the telecommunicator so as to transmit the arm position information to the processor (not shown) housed within processor housing 114. A shoulder or shelf 116 is mounted onto or otherwise formed on the upper end of housing 114. As better seen in FIG. 13, shoulder 116 has an upper planar surface 116a on which are pivotally mounted a pair of arm struts 118. Planar surface 116a is parallel to plane A in which arm struts 118 rotate on stub shafts 120. Rotation of stub shafts 120 about axes of rotation B transmits the arm position information via a position sensor (not shown) to the processor within housing 114. Leaf spring 122 rigidly mounted between stub shafts 120 resiliently biases arm struts 118 into either the closed position of FIGS. 9 and 12 wherein hand paddles 124 mounted on the distal ends of arm struts 118 are resiliently clamped together or the speaking mode open position of FIG. 10 wherein arm struts 118 are rotated in direction C into their fully spread apart position.

As better seen in FIGS. 14a-14c and FIG. 15, arm struts 118 are themselves pivotally mounted to stub shafts 120 for rotation relative to stub shafts 120 about axes of rotation D on stub axles 126. Rotating arm struts 118 about axes D allows movement of the arms out of plane A so as to put the arms into the whisper mode position of FIG. 11.

Rotation of arm struts 118 about axes D rotates bevel gears 118a on arm struts 118 in meshing engagement with crown gear 120a on stub shafts 120. Thus, irrespective of the rotational position of stub shafts 120, elevating and lowering arm struts 118 rotates crown gears 120a thereby signaling to the processor the vertical position information of arm struts 118. Stub shaft 120 is mounted by means of pin 126 shown exploded radially outwardly in FIG. 15. Thus contrasting FIGS. 14b and 14c, although between the two figures the rotational position of stub shaft 120 has not changed, the arm strut 118 has been elevated in FIG. 14c thereby rotating crown gear 120a relative to stub shaft 120.

Figure 16:
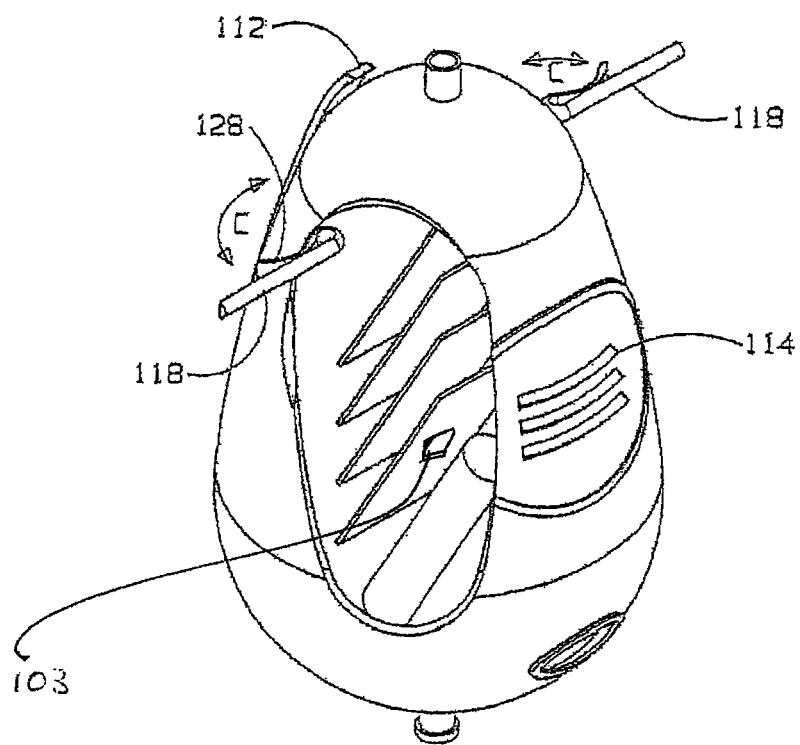
FIG. 16 is, in partially cut-away perspective view, an alternative embodiment of the processor housing with the housing and endoskeleton partially cut-away.

An alternative embodiment is illustrated in FIG. 16 in which, as labeled, all of the various components are built into or on the processor housing with the exception of a remote speaker and microphone for which only the respective connectors are illustrated. Other sensors rather than, or in addition to accelerometers 103 may be employed within or on the processor housing. Such sensors may detect sounds, or may include gyroscopes, magnetometers, pressure/touch/tactile/haptic based sensors, location sensors, etc. In addition to, or as a substitute for, the microphone which, as a sensory broadcaster, provides the audio prompts, other forms of sensory broadcaster prompting may be provided in or on the housing such as vibrators or rumble generators.

The housing 114 is enlarged so as to enclose shoulder 116, the gear ends of arm struts 118, the gears, etc. Consistent with all embodiments of housing 114, the circuit boards 130 containing the processors, the power supply, and the audio amplifier are all contained within the egg-shaped housing, tilted for example as illustrated so as to optimize use of the interior space of the housing. Arm struts rotate relative to the housing in cut-out channels 128.

The audible or other form of prompt menu for the companion telecommunicator works like a menu tree. Every choice made by the user leads to more choices until the function that the user wants is presented. Some prompts appear in more than one menu.

When the companion telecommunicator asks "what would you like to do?" the user has several choices. Each choice performs a specific function or presents more options. The choices are presented in the following order: "Present Lists", "Enter A Number", "Play Sound Clips", "Record Sound Clip", "Provide Status Information", and "Set Preferences". The choices are audibly repeated by the companion telecommunicator sequentially several times. If the user does not make a choice, the companion telecommunicator returns to stand-by mode.

The "Present Lists" choice lists stored phone numbers to call. The stored telephone numbers are sorted for presentation depending on the type of list selected. The choices are "Personal Call List", "Emergency Call List", "Incoming History List" and "Outgoing History List". The Personal Call List is automatically updated, according to frequency of use. The Emergency Call List presents the most important numbers first. The Incoming History List is updated according to the last number that called the companion telecommunicator. The Outgoing History List sorts the user's calls, starting with the most recent number.

The "Enter a Number" choice guides the user through telephone number entry and lets the user add the number to the phone list.

The "Sound Clip" choice lets the user record, play back or delete sound clips. Sound clips may be recorded during conversations, as reminders or transferred from the network or the user's home computer.

The "Provide Status Information" choice announces the user's phone number and the time and date, then tells the user if there are messages waiting, and reports battery level, signal strength, roaming status, available memory, and the like.

The "Set Preferences" choice customizes the way the companion telecommunicator responds and presents information.

The user can cancel any choice and return to the previous menu at any time by squeezing the companion telecommunicator three times.

Any time the user needs assistance on a particular menu item, the user squeezes the companion telecommunicator's hand 106 when the user is in that part of the menu. A sensor in the hand triggers the processor provide context sensitive audible help prompts.

To answer a call in Whisper Mode, the user lifts the companion telecommunicator's hands 106 to mouth 108, then places companion telecommunicator 100 near the user's ear. To answer a call in Speaking Mode, user 102 opens the companion telecommunicator's arms 110. The volume is automatically increased so as to be loud enough for a group of people to hear the conversation.

To terminate a call, user 102 places the companion telecommunicator in stand-by mode by closing arms 110.

For the user to place a call using Enter A Number menu:
1. The user places the companion telecommunicator in Whisper or Speaking Mode.
2. When the companion telecommunicator says "enter number", the user squeezes once.
3. The companion telecommunicator will count from zero to nine and say "place call".
4. The user squeezes the companion telecommunicator when the user hears the right digit.
5. The user repeats Step 4 for each digit in the number the user wishes to call.
6. If the user makes a mistake, the user squeezes the companion telecommunicator twice. When the companion telecommunicator says "erase last digit entered", the user squeezes once.
7. To review the digits entered, the user squeezes the companion telecommunicator twice. When the companion telecommunicator says "review digits entered", the user squeezes once.
8. When the user has entered all the digits in the number the user wants to call, the user squeezes and holds the companion telecommunicator—or squeezes the companion telecommunicator when its says "place call". The companion telecommunicator will tell the user the number the user is calling.
9. To terminate the call, the user places the companion telecommunicator in stand-by mode.

The companion telecommunicator remembers the last number the user called and will call that number again if the user selects Place Call before entering a digit.

To place a call from the Personal Call List which allows the user to place a call and modify telephone numbers, wherein the order of this list is updated automatically, with the most frequently used numbers at the top:
1. The user places the companion telecommunicator in Whisper or Speaking Mode.
2. The user squeezes once when the user hears "Present Lists".
3. The user squeezes again when the user hears "Personal Call List".
4. The user squeezes again when the user hears the name the user wants to call.
5. The companion telecommunicator will repeat the number the user is calling.
6. To terminate the call, the user places the companion telecommunicator in Stand-by Mode.

To call the user's favorite number:
1. The user places the companion telecommunicator in Whisper or Speaking Mode.
2. The user squeezes and holds while the companion telecommunicator asks: "What would you Like To Do?"
3. The companion telecommunicator will place the call.
4. To terminate the call, the user places the companion telecommunicator in stand-by mode.

For the user to place a call from the Emergency Call List, i.e., to call a stored Emergency Services number, (the first number in this list being the user's Quick Access Emergency Number:
1. The user places the user's companion telecommunicator in Whisper or Speaking Mode.
2. The user squeezes once when the user hears "Present Lists".
3. The user squeezes again when the user hears "Emergency Call List".
4. The user squeezes again when the user hears the name the user wants to call.
5. The companion telecommunicator will repeat the number the user is calling.
6. To terminate the call, the user places the companion telecommunicator in Stand-by Mode.

For the user to place a Quick Access Emergency Call:
1. The user places the companion telecommunicator in Whisper or Speaking Mode.
2. The user squeezes once when the user hears: "Present Lists".
3. The user squeezes again when the user hears: "Emergency Call List".
4. The user squeezes and holds while the companion telecommunicator lists names.
5. The companion telecommunicator will call the user's Quick Access Emergency Number.

For a short-cut to the user's Quick Access Emergency Number, the user starts with the companion telecommunicator's arms in the Stand-by position. The user squeezes the companion telecommunicator and raises the arms to Whisper or Speaking Mode. The companion telecommunicator will say: "Squeeze to place emergency call". The user squeezes to make the call. If the user doesn't squeeze within a few seconds, the companion telecommunicator will cancel the request.

For the user to place a call using the Incoming History List (which lets the user call one of the last 10 callers):
1. The user places the companion telecommunicator in Whisper or Speaking Mode.
2. The user squeezes once when the companion telecommunicator says: "Present Lists".
3. When the companion telecommunicator says: "Incoming History List", the user squeezes again.
4. The companion telecommunicator will list the last 10 calls for the user, starting with the most recent. The companion telecommunicator reports the telephone number, the date and time and whether or not the user answered the call. Sometimes calls will come from unknown sources, and the telephone number will not be available.
5. When the user hears the number the user wants to call, the user squeezes the companion telecommunicator once.
6. The companion telecommunicator will repeat the number the user is calling.
7. To terminate the call, the user places the companion telecommunicator in Stand-by Mode.

For the user to place a call using the Outgoing History List (which lets the user call one of the last 10 numbers called):
1. The user places the companion telecommunicator in Whisper or Speaking Mode.
2. The user squeezes once when the companion telecommunicator says: "Present Lists".
3. When the companion telecommunicator says: "Outgoing History List", the user squeezes again.
4. The companion telecommunicator will list the last 10 numbers called, starting with the most recent.
5. When the user hears the number the user wants to call, the user squeezes again.
6. The companion telecommunicator will tell the user the number the user is calling.
7. To terminate the call, the user places the companion telecommunicator in Stand-by Mode.

For the user to store a number in the user's Personal Call List:
1. The user places the companion telecommunicator in Whisper or Speaking Mode.
2. The user squeezes when the companion telecommunicator says: "Enter Number".
3. The companion telecommunicator will count from zero to nine and say: "Place Call".
4. The user squeezes the companion telecommunicator when the user hears the right digit.
5. The user repeats Step 4 for each digit in the number the user wants to call.
6. If the user makes a mistake, the user squeezes twice. When the companion telecommunicator says: "Erase Last Digit Entered", the user squeezes again.
7. To review the digits entered, the user squeezes the companion telecommunicator twice. When the user hears: "Review Digits Entered", the user squeezes again.
8. Once the user has entered all the digits in the number the user wants to call, the user squeezes twice, and when the companion telecommunicator says: "Store Number", the user squeezes again.
9. The companion telecommunicator will ask the user where the user wants to store the number: Personal Call List, Favorite Number or Emergency Call List.
10. The user squeezes when the user hears the right selection.
11. The companion telecommunicator will repeat the number.
12. To record a name for the number, the user follows the instructions to Squeeze and hold while recording, and the user speaks to the companion telecommunicator.

13. The companion telecommunicator will play back the name the user recorded.
14. The companion telecommunicator will say: "Squeeze to keep this sound clip".
15. The user squeezes to save this name and number.

For the User to Store the user's Favorite Number:
1. The user places the companion telecommunicator in Whisper or Speaking Mode.
2. The user squeezes when the companion telecommunicator says: "Enter Number".
3. The companion telecommunicator will count from zero to nine and say: "Place Call".
4. The user squeezes the companion telecommunicator when the user hears the right digit.
5. The user repeats Step 4 for each digit in the number the user wants to call.
6. If the user makes a mistake, the user squeezes twice. When the companion telecommunicator says: "Erase Last Digit Entered", the user squeezes again.
7. To review the digits entered, the user squeezes the companion telecommunicator twice. When the user hears: "Review Digits Entered", the user squeezes again.
8. Once the user has entered all the digits in the number the user wants to call, the user squeezes twice, and when the companion telecommunicator says: "Store Number", the user squeezes again.
9. The companion telecommunicator will ask where the user wants to store the number: Personal Call List, Favorite Number or Emergency Call List.
10. The user squeezes when the user hears the right selection.
11. The companion telecommunicator will repeat the number.
12. To record a name for the number, the user follows the instructions to Squeeze and hold while recording, and the user speaks to the companion telecommunicator.
13. The companion telecommunicator will play back the name the user has recorded.
14. The companion telecommunicator will say: "Squeeze to keep this sound clip".
15. The user squeezes to save this name and number.

For a User to Store an Emergency Number:
1. The user places the companion telecommunicator in Whisper or Speaking Mode.
2. The user squeezes when the companion telecommunicator says: "Enter Number".
3. The companion telecommunicator will count from zero to nine and say: "Place Call".
4. The user squeezes the companion telecommunicator when the user hears the right digit.
5. The user repeats Step 4 for each digit in the number the user wants to call.
6. If the user makes a mistake, the user squeezes twice. When the companion telecommunicator says: "Erase Last Digit Entered", the user squeezes again.
7. To review the digits entered, the user squeezes the companion telecommunicator twice. When the user hears: "Review Digits Entered", the user squeezes again.
8. Once the user has entered all the digits in the number the user wants to call, the user squeezes twice, and when the companion telecommunicator says: "Store Number", the user squeezes again.
9. The companion telecommunicator will ask where the user wants to store the number: Personal Call List, Favorite Number or Emergency Call List.
10. The user squeezes when the user hears the right selection.
11. The companion telecommunicator will repeat the number.
12. To record a name for the number, the user follows the instructions to Squeeze and hold while recording, and the user speaks to the companion telecommunicator.
13. The companion telecommunicator will play back the name the user recorded.
14. The companion telecommunicator will say: "Squeeze to keep this sound clip".
15. The user squeezes to save this name and number.

For the User to Move from Incoming History List to Personal Call List:
1. The user places the companion telecommunicator in Whisper or Speaking Mode.
2. The user squeezes when the companion telecommunicator says: "Present Lists".
3. The user squeezes when the companion telecommunicator says: "Incoming History List". The companion telecommunicator will list the last 10 calls, starting with the most recent. The companion telecommunicator reports the telephone number, the date and time and whether or not the user answered the call. Sometimes calls will come from unknown sources, and telephone numbers will not be available to the user.
4. When the user hears the number the user wants to move, the user squeezes twice.
5. The user squeezes again when the companion telecommunicator says: "Move This Entry to Personal Call List".
6. To record a name for the number, the user follows the instructions to Squeeze and hold while recording, and the user speaks to the companion telecommunicator 7.
7. The companion telecommunicator will play back the recorded name.
8. The companion telecommunicator will say: "Squeeze to keep this sound clip".
9. The user squeezes to save the name and number.

For the User to Move from Outgoing History List to Personal Call List:
1. The user places the companion telecommunicator in Whisper or Speaking Mode.
2. The user squeezes when the companion telecommunicator says: "Present Lists".
3. When the companion telecommunicator says: "Outgoing History List", the user squeezes again.
4. The companion telecommunicator will list the last 10 calls, starting with the most recent. The companion telecommunicator reports the telephone number, the date and time of the call.
5. When the user hears the number the user wants to move, the user squeezes twice.
6. The user squeezes again when the companion telecommunicator says; "Move this Entry to Personal Call List".
7. To record a name for the number, the user follows the instructions to Squeeze and hold while recording, and the user speaks to the companion telecommunicator.
8. The companion telecommunicator will play back the recorded name.
9. The companion telecommunicator will say: "Squeeze to keep this sound clip".
10. The user squeezes to save the name and number.

For the User to Modify Stored Numbers:
1. The user places the companion telecommunicator in Whisper or Speaking Mode.
2. The user squeezes when the companion telecommunicator says: "Present Lists".

3. The user squeezes again when the companion telecommunicator says: "Personal Call Lists".
4. When the user hears the name for the number the user wants to modify, the user squeezes twice.
5. The user squeezes again when the companion telecommunicator says: "Modify".
6. The user squeezes again when the companion telecommunicator says: "Change Number".
7. The companion telecommunicator will count from zero to nine and say: "Store Number".
8. The user squeezes when the companion telecommunicator says the right digit.
9. The user repeats Step 8 for each digit in the number the user wants to modify.
10. If the user makes a mistake, the user squeezes the companion telecommunicator twice. When the companion telecommunicator says: "Erase Last Digit Entered", the user squeezes again.
11. To review the digits entered, the user squeezes the companion telecommunicator twice. When the companion telecommunicator says: "Review Digits Entered", the user squeezes again.
12. Once the user has entered all the digits in the modified number, the user squeezes twice. When the companion telecommunicator says: "Store Number", the user squeezes again.
13. The companion telecommunicator will repeat the new number and save it.

For the User to Modify Names for Stored Numbers:
1. The user places the companion telecommunicator in Whisper or Speaking Mode.
2. The user squeezes when the companion telecommunicator says: "Present Lists".
3. The user squeezes again when the companion telecommunicator says: "Personal Call List".
4. When the companion telecommunicator says the name the user wants to modify, the user squeezes twice.
5. The user squeezes again when the companion telecommunicator says: "Modify".
6. The user squeezes again when the user hears: "Change Name".
7. To record a modified name, the user follows the instructions to Squeeze and hold to while recording, and the user speaks to the companion telecommunicator.
8. The companion telecommunicator will play back the recorded name.
9. The companion telecommunicator will say: "Squeeze to keep this sound clip".
10. The user squeezes to save the new name.

For the User to Delete Stored Numbers:
1. The user places the companion telecommunicator in Whisper or Speaking Mode.
2. The user squeezes when the companion telecommunicator says: "Present Lists".
3. The user squeezes when the companion telecommunicator says the name of the list (Personal Call List or Emergency Call List).
4. When the companion telecommunicator says the name for the entry delete, the user squeezes twice.
5. The user squeezes again when the user hears: "Modify".
6. The user squeezes again when the companion telecommunicator says: "Delete Entry".
7. The companion telecommunicator will say: "Entry Deleted".

For the User to Clear the Incoming History List
1. The user places the companion telecommunicator in Whisper or Speaking Mode.
2. The user squeezes when the user hears: "Present Lists".
3. When the companion telecommunicator says: "Incoming History List", the user squeezes again.
4. The companion telecommunicator will list all the names and numbers in the Incoming History List, then say: "Clear Incoming History List".
5. The user squeezes to clear the entire list.
6. To clear the list without listening to all the names and numbers, the user squeezes and holds when the companion telecommunicator is listing names and numbers in the Incoming History List.
7. The companion telecommunicator will say: "Clearing Incoming History List".

For the User to Clear the Outgoing History List
1. The user places the companion telecommunicator in Whisper or Speaking Mode.
2. The user squeezes when the user hears: "Present Lists".
3. When the companion telecommunicator says: "Outgoing History List", the user squeezes again.
4. The companion telecommunicator will list all the names and numbers in the Outgoing History List, then say: "Clear Outgoing History List".
5. The user squeezes to clear the entire list.
6. To clear the list without listening to all the names and numbers, the user squeezes and holds when the companion telecommunicator is listing names and numbers in the Outgoing History List.
7. The companion telecommunicator will say: "Clearing Outgoing History List".

For the User to Review Stored Numbers:
1. The user places the companion telecommunicator in Whisper or Speaking Mode.
2. The user squeezes when the user hears: "Present Lists".
3. The user squeezes when the companion telecommunicator says the right list (Personal Call List or Emergency Call List).
4. The user squeezes twice when the companion telecommunicator says the name for the number the user wants to hear.
5. The user squeezes again when the companion telecommunicator says: "Hear this number".
6. The companion telecommunicator will repeat the number the user wants to hear.

For the User to Record Sound Clips during a Conversation and to help the User to remember, the companion telecommunicator can record both sides of the conversation.
1. During a telephone call, the user squeezes the companion telecommunicator twice.
2. The user squeezes when the user hears: "Record Sound Clip".
3. The user squeezes and holds to record part of the conversation. The user lets go to stop recording.

For the User to Record Sound Clips Outside a Conversation and taking notes of anything the User wants to remember:
1. The user places the companion telecommunicator in Whisper or Speaking Mode.
2. The user squeezes when the user hears: "Record Sound Clip".
3. The companion telecommunicator says: "Squeeze and hold while recording".
4. Once the user lets go to stop recording, the companion telecommunicator will report time consumed and amount of memory remaining.

For the User to Play Back Sound Clips During Conversation and share sound clips during a conversation:
1. During a telephone call, the user squeezes the companion telecommunicator twice.

2. When the companion telecommunicator says: "Play Sound Clips", the user squeezes again.
3. The companion telecommunicator will list; Recordings, Messages, Songs, Stories and Sound Effects. The user squeezes when the user hears the right choice.
4. To skip to the next sound clip, the user squeezes during or after playback.
5. To delete sound clips, the user squeezes and holds during playback.
6. To replay the sound clip, the user clicks twice during or after playback.

For the user to play back sound clips (which lets the user play back recorded reminders or details of a conversation):
1. The user places the companion telecommunicator in Whisper or Speaking Mode.
2. The user squeezes when the companion telecommunicator says: "Play Sound Clips".
3. The companion telecommunicator will list: Recordings, Messages, Songs, Stories and Sound Effects. The user squeezes when the user hears the right choice.
4. The companion telecommunicator plays the first sound clip.
5. To skip to the next sound clip, the user squeezes during or after playback.
6. To delete sound clips, the user squeezes and holds during playback.
7. To replay the sound clip, the user clicks twice during or after playback.

With optional software and subscriptions, the user can also play back digital streams from other companion telecommunicator communicators, or material downloaded from a personal computer or network broadcasts.

There are two ways for the user to change volume during a conversation. During a telephone call, the user squeezes and holds the companion telecommunicator and the volume will increase to maximum volume level, then decrease to minimum. The user lets go once the volume has reached the desired level. The user can also adjust the volume by squeezing the companion telecommunicator's ears. The user increases the volume by squeezing the right ear, and decreases the volume by squeezing the left ear. The user lets go once the volume has reached the desired level.

The companion telecommunicator has several methods of indicating an incoming call: Caller Announce, Greeting, Tone, Melody, Vibrate. In Caller Announce mode the companion telecommunicator announces the name of the caller if the caller is in the user's Personal Call List. If the name is not in the user's Personal Call List, the companion telecommunicator announces the phone number calling. If telephone number identification is unavailable, the companion telecommunicator says: "Caller Unknown". In Greeting mode, the companion telecommunicator says: "It's for you". In Tone mode the companion telecommunicator rings with normal cellular tones. In Melody mode the companion telecommunicator gets the user's attention with a musical greeting. In Vibrate mode the companion telecommunicator vibrates to alert the user to an incoming call.

The user Changes the Call Alert Selection by:
1. Placing the companion telecommunicator in Whisper or Speaking Mode.
2. Squeezing when the companion telecommunicator says: "Set Preferences".
3. Squeezing again when the user hears: "Call Alert Selection".
4. Squeezing again when the user hears the preferred selection.

There are two ways the user changes the call alert volume during an incoming call. While the companion telecommunicator is receiving a call, the user squeezes and holds. The volume will decrease to minimum volume level, then increase to maximum. The user lets go once the volume has reached the desired level. The user can also adjust the volume by squeezing the companion telecommunicator's ears. The user increases the volume by squeezing the right ear, and decreases the volume by squeezing the left ear. The user lets go once the volume has reached the desired level.

The user can choose the amount of information the companion telecommunicator will give the user during audio prompts. There are two prompt levels: Make it Brief and Tell Me Lots. For the more experienced user, the Make it Brief option gives the user short audio prompts. For the novice, the Tell Me Lots option gives the user longer, detailed audio prompts.

The Set Level of Assistance option lets the user select the information level during audio prompts. The user places the companion telecommunicator in Whisper or Speaking Mode. The user squeezes when the user hears: "Set Preferences". The companion telecommunicator will report the current prompt level. The user squeezes once to choose the other level.

The Getting Status Information option allows the user to get status information about the companion telecommunicator. The user places the companion telecommunicator in Whisper or Speaking Mode. The user squeezes when the user hears: "Provide Status Information". The companion telecommunicator announces the telephone number and time and date and tells the user if the user has messages waiting, then reports current battery level, signal strength, roaming status, memory available in minutes and seconds, the current billing rate, and balance remaining on card (optional). The user squeezes to advance to the next report.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A sensory prompted interface device using a time domain multiple selection protocol for operating an electric product, the interface device comprising:
   a processor and cooperating memory,
   a sensory broadcaster cooperating with said processor, said sensory broadcaster adapted to broadcast a sequenced series of sensory prompts,
   a binary state sensor for receiving only a binary input from a user, said binary input for binary biasing of said binary state sensor in response to a prompt of said series of sensory prompts,
   a timing reference cooperating with said processor, said processor correlating said response to said prompt with a corresponding time domain within a sequential series of time domains,
   said processor correlating said time domain with said prompt and executing an action corresponding to said prompt according to an instruction set in said memory.

2. The device of claim 1 wherein data comprising said series of prompts is compressed so as to increase speed of presentation of said series of prompts.

3. The device of claim 1 wherein said binary state sensor is chosen from the group comprising a binary state switch, at least one accelerometer, at least one gyroscope, at least one magnetometer, at least one pressure sensor, at least one touch sensor, at least one tactile/haptic sensor, at least one sound sensor, at least one location sensor.

4. The device of claim 1 wherein said series of prompts are prompts in a multi-level menu tree, and wherein a lack of input from a user after a pre-selected number of prompts in said series of prompts results in a backing up in said menu tree to prompts at higher levels in said menu tree.

5. The device of claim 1 wherein said speed of presentation of said series of prompts is increased according to feedback in an adaptive feedback loop wherein said speed of presentation is increased.

6. The device of claim 1 wherein said binary state sensor is adapted to be biased a plurality of times in rapid succession and the action corresponding to biasing of said switch is different depending on the number of times said binary state sensor is biased in said rapid succession.

7. The device of claim 1 wherein said binary state sensor is a microphone cooperating with means for detecting audible input into said microphone within said single time domain and for registering said audible input into said microphone as said input for biasing of said binary state sensor.

8. A sensory prompted interface method using a time domain multiple selection protocol for operating an electric product, the interface method comprising the steps of:
   a) providing a processor and cooperating memory,
   b) providing a sensory broadcaster cooperating with said processor, wherein said sensory broadcaster is adapted to broadcast a sequenced series of sensory prompts,
   c) providing a binary state sensor adapted to only receive a binary input from a user, said binary input for binary biasing of said binary state sensor in response to a prompt of said series of sensory prompts,
   d) prompting said user for said input,
   e) providing a timing reference cooperating with said processor and generating a sequential series of time domains,
   f) correlating in said processor said in put in said response to said prompt with a corresponding time domain within said sequential series of time domains,
   g) correlating in said processor said time domain with said prompt, and
   h) executing an action corresponding to said prompt according to said instruction set in said memory.

9. The method of claim 8 wherein data comprising said series of prompts is compressed so as to increase speed of presentation of said series of prompts.

10. The method of claim 8 wherein said binary state sensor is chosen from the group comprising binary state switch, at least one accelerometer, at least one gyroscope, at least one magnetometer, at least one pressure sensor, at least one touch sensor, at least one tactile/haptic sensor, at least one sound sensor, at least one location sensor.

11. The method of claim 8 wherein said series of prompts are prompts in a multi-level menu tree, and wherein a lack of input from a user after a pre-selected number of prompts in said series of audible prompts results in a backing up in said menu tree to prompts at higher levels in said menu tree.

12. The method of claim 8 wherein said speed of presentation of said series of audible prompts is increased according to feedback in an adaptive feedback loop wherein said speed of presentation is increased.

13. The method of claim 8 wherein said binary state sensor is adapted to be biased a plurality of times in rapid succession and the action corresponding to biasing of said switch is different depending on the number of times said binary state sensor is biased in said rapid succession.

14. The method of claim 8 wherein said binary state sensor is a microphone cooperating with means for detecting audible input into said microphone within said single time domain and for registering said audible input into said microphone as said input for biasing of said binary state sensor.

* * * * *